United States Patent
Koga et al.

(10) Patent No.: US 9,010,738 B2
(45) Date of Patent: Apr. 21, 2015

(54) FLUID FILLED VIBRATION DAMPING DEVICE

(71) Applicant: Tokai Rubber Industries, Ltd., Komaki-shi, Aichi (JP)

(72) Inventors: Satoki Koga, Komaki (JP); Chiyaki Inoue, Komaki (JP); Takehiro Okanaka, Kasugai (JP)

(73) Assignee: Sumitomo Riko Company Limited, Komaki (JP)

( * ) Notice: Subject to any disclaimer, the term of this patent is extended or adjusted under 35 U.S.C. 154(b) by 0 days.

(21) Appl. No.: 14/274,017

(22) Filed: May 9, 2014

(65) Prior Publication Data

US 2014/0246821 A1 Sep. 4, 2014

Related U.S. Application Data

(63) Continuation of application No. PCT/JP2013/000561, filed on Feb. 1, 2013.

(30) Foreign Application Priority Data

Mar. 23, 2012 (JP) .................................. 2012-067789

(51) Int. Cl.
  *F16F 13/00* (2006.01)
  *F16F 13/10* (2006.01)
(52) U.S. Cl.
  CPC ................ *F16F 13/10* (2013.01); *F16F 13/105* (2013.01); *F16F 2230/06* (2013.01); *F16F 13/107* (2013.01)
(58) Field of Classification Search
  CPC ....... F16F 13/10; F16F 13/102; F16F 13/105; F16F 13/107

USPC ............................................... 267/136–141.7
See application file for complete search history.

(56) References Cited

U.S. PATENT DOCUMENTS

| 2006/0208405 A1* | 9/2006 | Muramatsu et al. ...... 267/140.11 |
| 2009/0008195 A1* | 1/2009 | Ueki ........................... 188/282.6 |
| 2010/0102495 A1* | 4/2010 | Okumura et al. ........ 267/140.13 |

FOREIGN PATENT DOCUMENTS

| JP | B-3967831 | 8/2007 |
| JP | A-2009-8185 | 1/2009 |
| JP | A-2009-210061 | 9/2009 |
| JP | B-4361998 | 11/2009 |

(Continued)

OTHER PUBLICATIONS

Translation of International Preliminary Report on Patentability dated Oct. 2, 2014 from International Application No. PCT/JP2013/000561.

(Continued)

*Primary Examiner* — Vishal Sahni
(74) *Attorney, Agent, or Firm* — Oliff PLC (57) ABSTRACT

A post-formation filling type fluid filled vibration damping device wherein a first communication groove, which interconnects a plurality of through holes, is formed in a partition member that separates a pressure receiving chamber and an equilibrium chamber, the groove being formed in a surface of the partition member that opposes a flexible membrane. In addition, a second communication groove, which connects an orifice passage and at least one of the plurality of through holes, is formed in the surface of the partition member that opposes the flexible membrane.

4 Claims, 5 Drawing Sheets

(56) References Cited

FOREIGN PATENT DOCUMENTS

| | | |
|---|---|---|
| JP | A-2010-106866 | 5/2010 |
| JP | A-2010-242871 | 10/2010 |
| JP | B-4790668 | 10/2011 |

OTHER PUBLICATIONS

International Search Report issued in International Application No. PCT/JP2013/000561 mailed Mar. 5, 2013.

* cited by examiner

FIG.10

FLUID FILLED VIBRATION DAMPING DEVICE

INCORPORATED BY REFERENCE

The disclosure of Japanese Patent Application No. 2012-067789 filed on Mar. 23, 2012 including the specification, drawings and abstract is incorporated herein by reference in its entirety. This is a Continuation of International Application No. PCT/JP2013/000561 filed on Feb. 1, 2013.

BACKGROUND OF THE INVENTION

1. Field of the Invention

The present invention relates to a vibration damping device to be used, for example, for an automobile engine mount, especially to a fluid filled vibration damping device using vibration effects based on the flow behavior of an incompressible fluid sealed therein.

2. Description of the Related Art

Conventionally, as a vibration damping device interposed between the members constituting a vibration transmission system that connects said members to each other or supports them in a vibration-damping manner, there has been known a fluid filled vibration damping device using vibration damping effects based on the flow behavior of an incompressible fluid sealed therein. This fluid filled vibration damping device has a structure where a first mounting member and a second mounting member are elastically connected by a main rubber elastic body, wherein a pressure receiving chamber with its walls partially composed of the main rubber elastic body and a equilibrium chamber with its walls partially composed of a flexible membrane are formed, and further, an orifice passage is formed to connect said pressure receiving chamber and said equilibrium chamber with each other. In addition, in a containing space formed within a partition member that separates the pressure receiving chamber from the equilibrium chamber, a movable member is arranged to which fluid pressures of the pressure receiving chamber and equilibrium chamber are applied via a plurality of through holes penetrating through the walls of the containing space, thus constituting a fluid pressure transmission mechanism that transmits fluid pressure between the two chambers taking advantage of the deformation or displacement of the movable member. For example, the one disclosed in Japanese Patent No. JP-B-4790668 is such a device.

Meanwhile, it is feasible to seal the incompressible fluid in the pressure receiving chamber and the equilibrium chamber, for example by carrying out the forming process of the pressure receiving chamber and the equilibrium chamber within a water tank filled with the incompressible fluid, but as shown in JP-B-4790668, the incompressible fluid is sometimes sealed in the pressure receiving chamber and the equilibrium chamber after the formation thereof. In such a post-formation filling type fluid filled vibration damping device, a communication passage is formed that connects the pressure receiving chamber and the equilibrium chamber with the exterior space, wherein the incompressible fluid is poured into these pressure receiving chamber and equilibrium chamber after air therein is forced out via the communication passage.

However, if one tries to force out (vacuum draw) air in the pressure receiving chamber and the equilibrium chamber via the communication passage, the inner pressures of the pressure receiving chamber and the equilibrium chamber drop down so that the flexible membrane made easily deformable is adsorbed to the side of the partition member. Especially, according to the structure of JP-B-4790668, the communication passage is open to the pressure receiving chamber by which air in the equilibrium chamber is let out via the orifice passage. Therefore, the flexible membrane is quickly deformed around the opening of the orifice passage on the side of the equilibrium chamber to cover such opening, thus posing a risk of residual air remaining in the equilibrium chamber.

In addition, once any opening of the through holes on the equilibrium chamber side is covered with the flexible membrane under the condition where the through holes penetrating through the walls of the containing space on the side of the pressure receiving chamber are blocked because the movable member is adsorbed to the inner wall of the containing space on the side of the pressure receiving chamber due to the negative pressure thereof, the space between the opposing faces of the movable member and the flexible membrane is sealed off. As a result, air can be trapped within the sealed through holes, which can pose a risk of air being led to the liquid chambers to cause its compressibility to adversely affect the vibration damping properties.

SUMMARY OF THE INVENTION

The present invention was made against the background described above, and the problem to be solved thereby is to provide a new fluid filled vibration damping device with a new structure that is effective in obtaining desired vibration damping properties by means of preventing air from remaining in the post-formation filling type device due to the adsorption of the flexible membrane to the partition member thereof at the time of vacuum drawing.

A first mode of the present invention provides a fluid filled vibration damping device including: a first mounting member and a second mounting member, which are elastically connected by a main rubber elastic body; a pressure receiving chamber formed with a wall partially composed of the main rubber elastic body disposed on one side of a partition member provided on a side of the second mounting member; an equilibrium chamber formed with a wall partially composed of a flexible membrane disposed on an other side of the partition member; an orifice passage formed through the partition member to connect the pressure receiving chamber and the equilibrium chamber with each other; a movable member is arranged in a containing space formed in the partition member such that fluid pressures of the pressure receiving chamber and the equilibrium chamber are exerted on the movable member via a plurality of through holes that penetrate through walls of the containing space; and a fluid injection passage that is communicated with the pressure receiving chamber and the equilibrium chamber with an opening thereof out to an exterior closed, wherein the partition member is formed with a first communication groove opening up to a surface of the partition member facing the flexible membrane to communicate the plurality of through holes with each other, and a second communication groove opening up to the surface of the partition member facing the flexible membrane to communicate the orifice passage with at least one of the plurality of through holes.

With the fluid filled vibration damping device with a structure according to the first mode mentioned above, when air in the pressure receiving chamber and the equilibrium chamber is forced out (vacuum drawn) via the fluid injection passage, the plurality of through holes remain communicated with each other via the first communication groove even if the pressure in the equilibrium chamber drops down to make the flexible membrane stick to the partition member. At least one of the through holes remains communicated with the orifice passage via the second communication groove. This allows air in the through holes to flow into the orifice passage via the first and second communication grooves even if the opening of the through holes on the side of the equilibrium chamber is covered with the flexible membrane. Thus, air in the through holes is led from the orifice passage to the fluid injection passage to be forced out to the exterior space. Therefore, the device prevents air from remaining in the through holes due to the sticking of the flexible membrane to the partition member, thus achieving the desired vibration damping properties.

Moreover, if the fluid injection passage is open to the orifice passage or the walls of the pressure receiving chamber, the flexible membrane is quickly adsorbed to the side of the partition member around the opening of the orifice passage, because air in the equilibrium chamber is let out via the orifice passage. In this case, since the plurality of through holes opening up to the equilibrium chamber are communicated with the orifice passage via the first and second communication grooves, air in the equilibrium chamber is allowed to flow into the orifice passage via the through holes as well as the first and second communication grooves even if the opening of the orifice passage is covered with the flexible membrane. Therefore, air in the equilibrium chamber is prevented from remaining therein to avoid an adverse effect on the vibration damping properties due to the compressibility of the residual air and the like.

A second mode of the present invention provides the fluid filled vibration damping device according to the first mode, wherein the first and second communication grooves are formed independent from each other.

A third mode of the present invention provides the fluid filled vibration damping device according to the first mode, wherein the first and second communication grooves are formed under conditions of partially common use by being connected with each other.

A fourth mode of the present invention provides the fluid filled vibration damping device according to any one of the first through third modes, wherein one end of the fluid injection passage is open to an inner wall of the orifice passage so that the fluid injection passage is communicated with the pressure receiving chamber and the equilibrium chamber via the orifice passage.

In the structure where the fluid injection passage is communicated with the equilibrium chamber via the orifice passage as described in the fourth mode, since the opening of the orifice passage on the side of the equilibrium chamber is communicated with the through holes via the first and second communication grooves, air in the equilibrium chamber led to the through holes flows into the orifice passage via the first and second communication grooves. Therefore, air in the equilibrium chamber is stably let out to prevent an adverse effect on the vibration damping properties due to the residual air even under the conditions where the opening of the orifice passage on the equilibrium chamber side is covered with the flexible membrane.

According to the present invention, the first communication groove that opens out on the surface of the partition member on the side of the equilibrium chamber connecting the plurality of through holes with each other is formed together with the second communication groove that opens out on the surface of the partition member on the side of the equilibrium chamber connecting at least one of the plurality of through holes with the orifice passage. This allows air in the through holes and the equilibrium chamber to be led to the fluid injection passage via the first and second communication grooves to be exhausted during the vacuum drawing whereby air in the pressure receiving chamber and the equilibrium chamber is forced out to avoid an adverse effect on the vibration damping properties due to the residual air therein, thus achieving the desired vibration damping properties in a stable manner.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Embodiments of the present invention will be described below in reference to the drawings.

FIGS. 1 to 6 show an automobile engine mount 10 as a first embodiment of the fluid filled vibration damping device with a structure according to the present invention. The engine mount 10 has a structure where a first mounting member 12 and a second mounting member 14 are elastically connected by a main rubber elastic body 16. In the following descriptions, the vertical direction basically indicates an up-and-down direction of FIG. 3, which is the direction of center axis of the mount.

Figure 1:
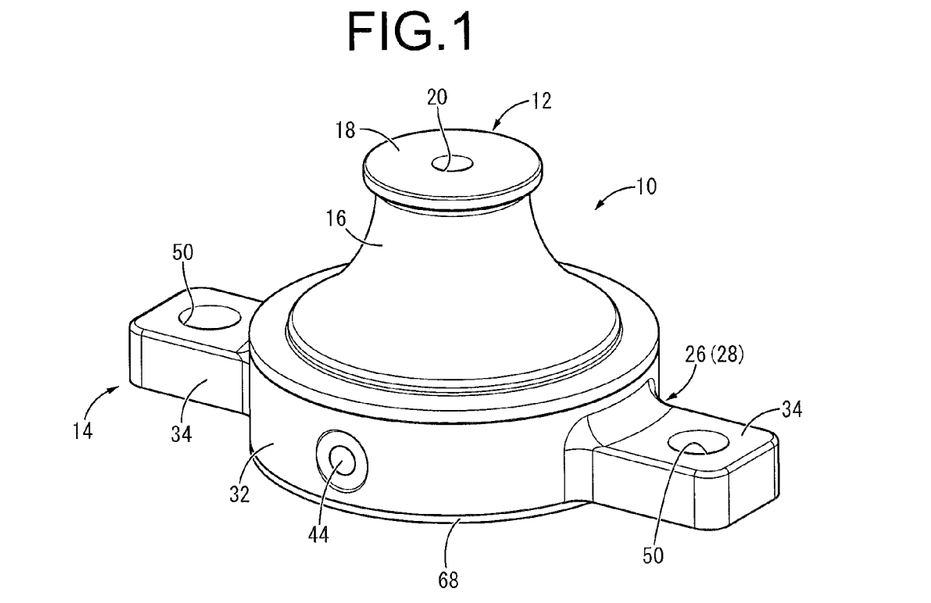
FIG. 1 is a perspective view of an engine mount as a first embodiment of the present invention.
Figure 2:
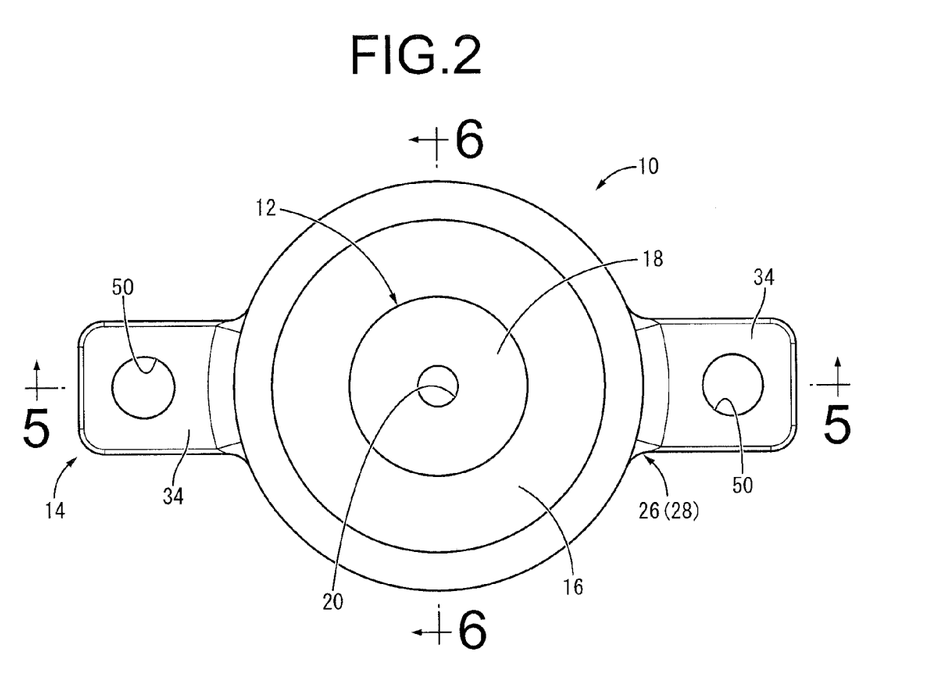
FIG. 2 is a plan view of the engine mount shown in FIG. 1.
Figure 3:
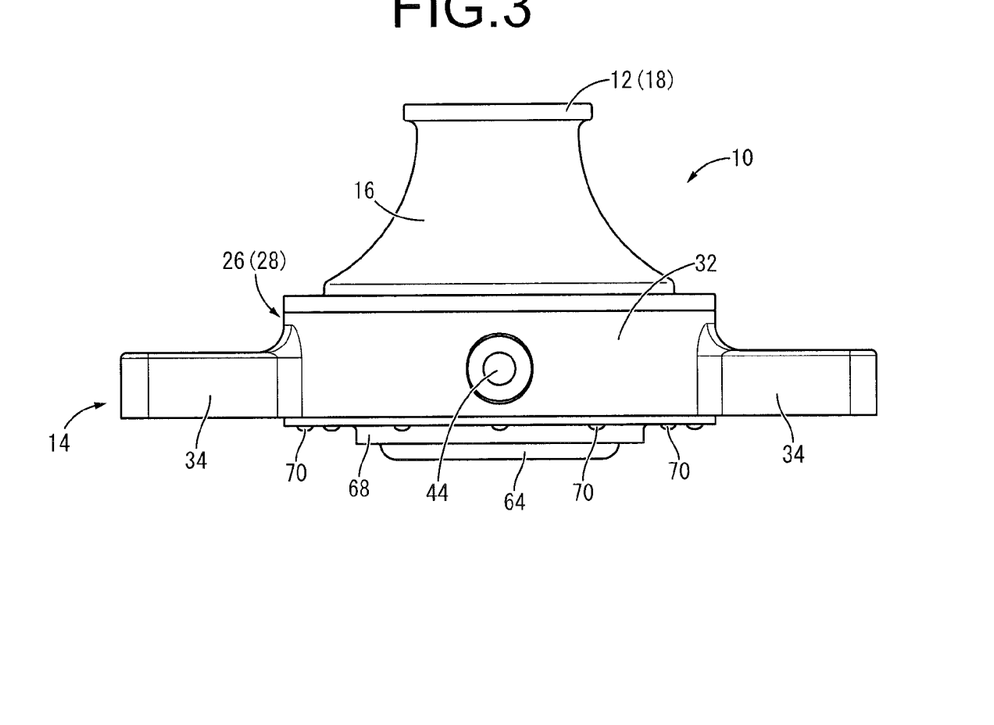
FIG. 3 is a front view of the engine mount shown in FIG. 2.
Figure 4:
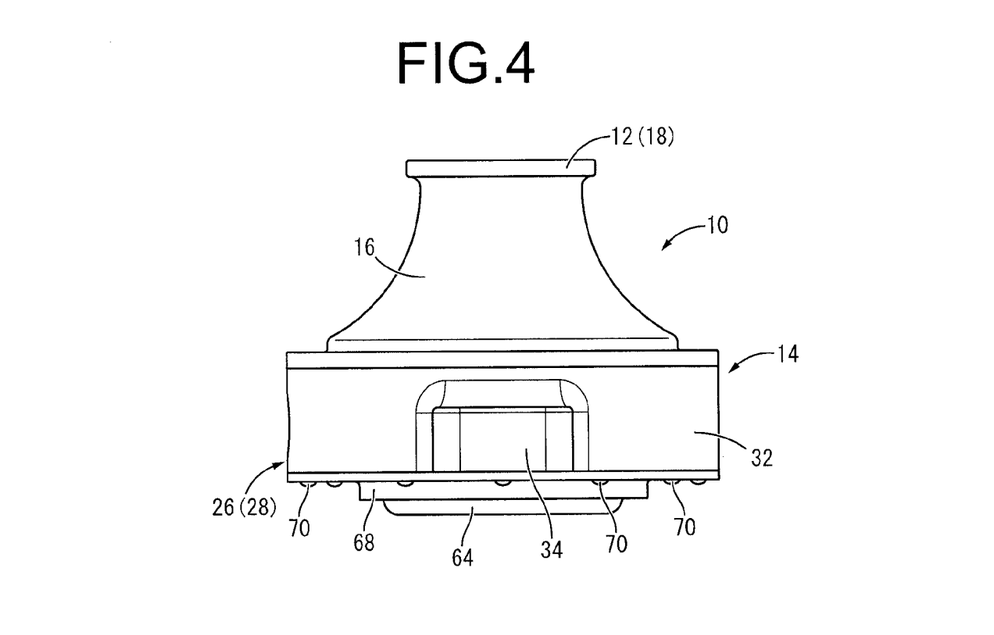
FIG. 4 is a right side view of the engine mount shown in FIG. 2.
Figure 5:
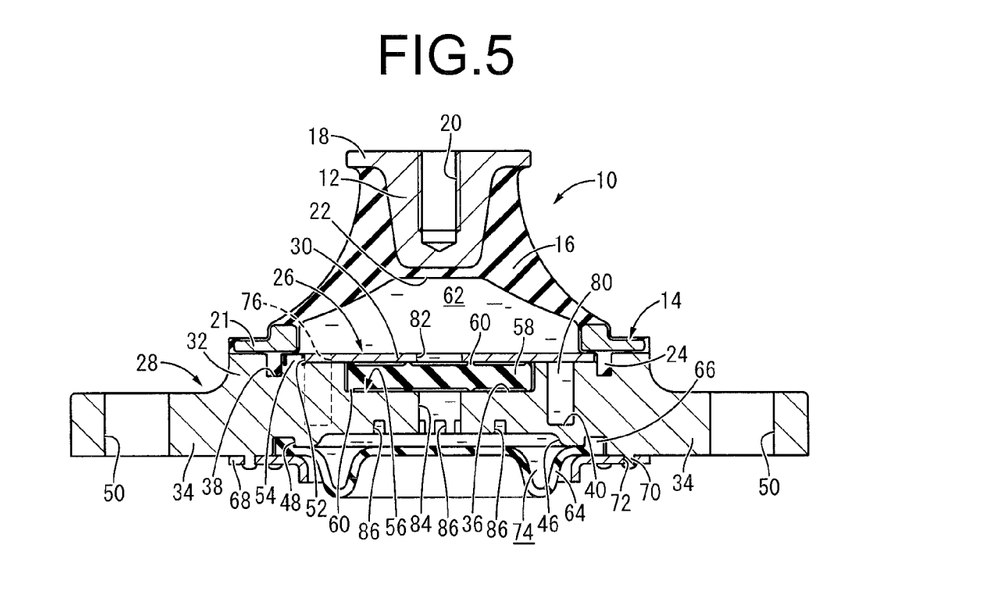
FIG. 5 is a cross-sectional view taken along line 5-5 indicated in FIG. 2.
Figure 6:
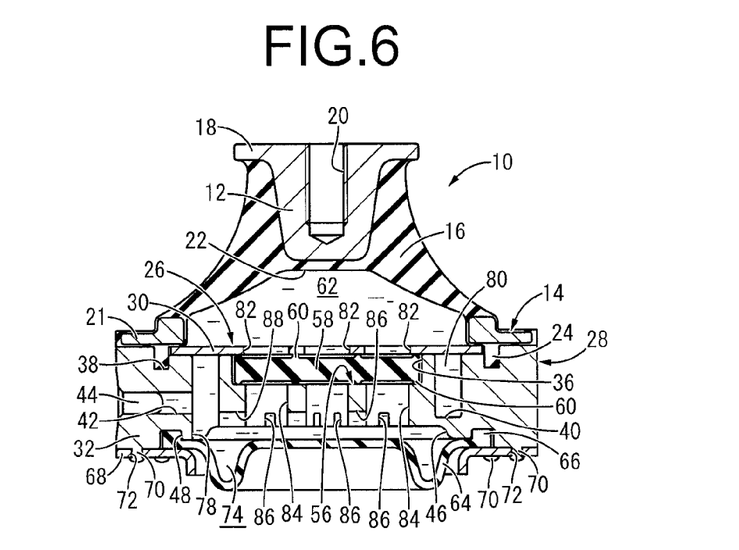
FIG. 6 is a cross-sectional view taken along line 6-6 indicated in FIG. 2.

More specifically, the first mounting member 12 is made of a high rigidity material formed of iron, aluminum alloy, hard synthetic resin and the like in an approximate form of an inverted small-radius truncated cone reducing its radius downward. Also, along the upper end of the first mounting member 12, a flange 18 is integrally formed continuously all the way around the circumference protruding toward the outer periphery. In addition, in the first mounting member 12, a screw hole 20 is formed vertically on the central axis opening out on the top face.

Also, a ring-shaped retaining member 21 is arranged below the first mounting member 12. The retaining member 21, made of a high-rigidity material as is the first mounting member 12, is in an annular form extending with nearly the same cross-section all the way around the circumference. Meanwhile, the retaining member 21 of the present embodiment has a step in the middle of the width in the radial direction, wherein the inner peripheral side of the step is made thicker than the outer peripheral side.

Then, the first mounting member 12 and the retaining member 21 are arranged separately one above the other on the same central axis, which are elastically connected with each other by the main rubber elastic body 16. The main rubber elastic body 16 is in an approximate form of a truncated cone with large diameters and thick walls with its smaller-diameter end vulcanizingly adhered to the first mounting member 12 and its larger-diameter end vulcanizingly adhered to the retaining member 21. The main rubber elastic body 16 is formed as an integrally molded and vulcanized part having the first mounting member 12 and the retaining member 21. Also, in the present embodiment, the retaining member 21 is covered with the main rubber elastic body 16 all over the surface.

In addition, a large-diameter recess 22 is formed in the main rubber elastic body 16. The large-diameter recess 22 is a recess in an approximate form of a cone placed upside down and opens out (downward) on the larger-diameter end surface of the main rubber elastic body 16.

Furthermore, an annular protrusion 24 is integrally formed with the main rubber elastic body 16. The annular protrusion 24 is integrally formed at a portion of the main rubber elastic body 16 that covers the bottom face of the retaining member 21, which is provided continuously with nearly the same cross-section all the way around the circumference to protrude downward.

Also, a partition member 26 is attached to the main rubber elastic body 16 on the side of the retaining member 21 which is an integrally molded and vulcanized part of the main rubber elastic body 16. The partition member 26 is made in a plate form extending in the axis-perpendicular direction as a whole and is provided with a partition member main body 28 and a cover member 30.

As shown in FIGS. 5 to 8, the partition member main body 28 is made of a hard material formed of metal or hard synthetic resin, which is provided with a main body 32 in an approximate form of a disk and a mounting portion 34 integrally formed with the main body 32.

Figure 7:
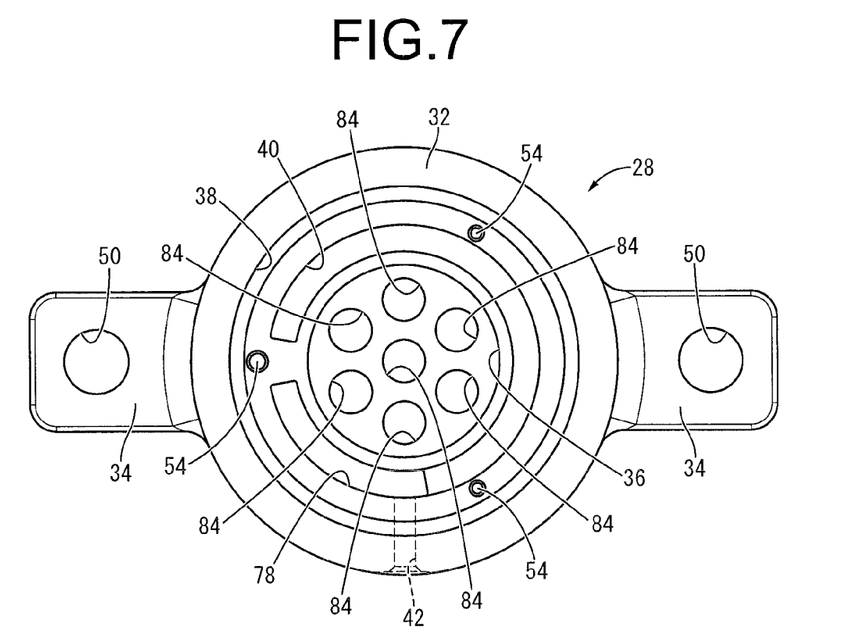
FIG. 7 is a plan view of the partition member main body composing the engine mount shown in FIG. 1.
Figure 8:
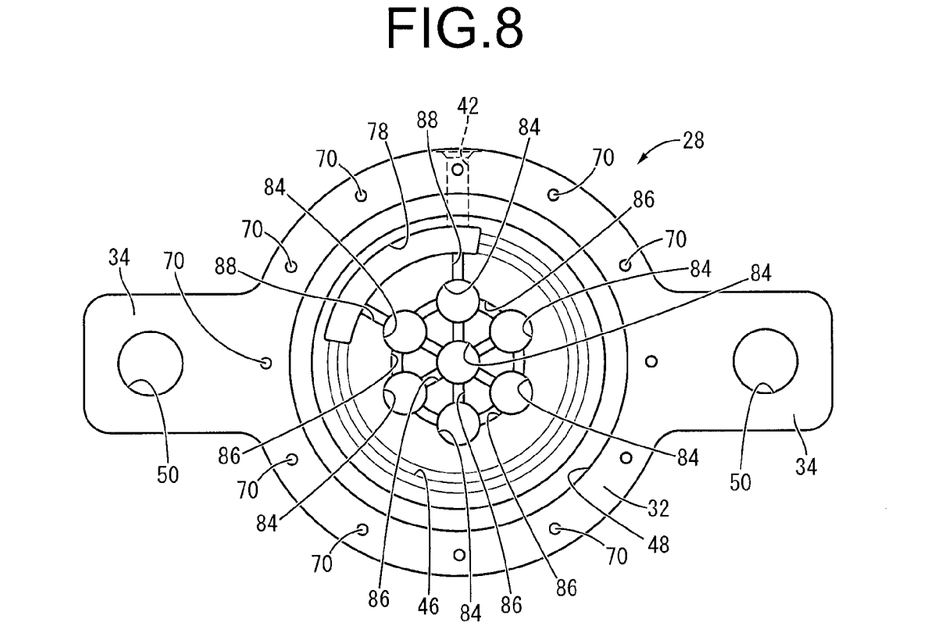
FIG. 8 is a bottom view of the partition member main body shown in FIG. 7.

The main body 32 is in an approximate form of a disk with a large diameter and thick walls, on which a containing recess 36 in a circular form is formed opening upward at the center in the radial direction. On the outer peripheral side of the containing recess 36 of the main body 32, a fitting groove 38 is formed opening upward and extending annularly in the circumferential direction. In addition, in the middle between the containing recess 36 and the fitting groove 38 in the radial direction, a peripheral groove 40 is formed opening upward and extending in the circumferential direction for the length of a little less than a circumference. Furthermore, a fluid injection passage 42 is formed in the partition member 26 extending linearly in the radial direction with nearly the same circular cross-section, one end of which opens out on the inner wall on the outer peripheral side of the peripheral groove 40, while the other end opens out on the outer periphery of the main body 32 and is closed with a sealing member 44 pressed therein in a fluid tight way.

Also, at the center of the main body 32 in the radial direction, a central recess 46 in a circular form is formed opening out on the bottom face. On the outer peripheral side of the central recess 46 of the main body 32, a locking groove 48 is formed to open out on the bottom face thereof annularly extending in the circumferential direction.

The mounting portion 34 is made in an approximate form of a plate extending approximately in a axis-perpendicular direction and is integrally formed with the main body 32 so that a pair of mounting portions 34, 34 protrude out therefrom to each side in a radial direction. Additionally, a bolt hole 50 is formed in each mounting portion 34 that penetrates through the thickness thereof.

Figure 9:
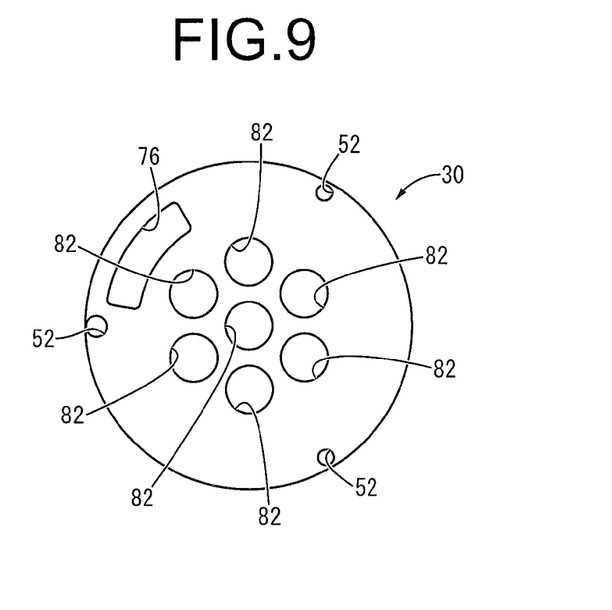
FIG. 9 is a plan view of the cover member composing the engine mount shown in FIG. 1.

Meanwhile, as shown in FIGS. 5, 6, 9 and others, the cover member 30 is in a form of a thin circular disc, and its diameter is made smaller than that of the main body 32 of the partition member main body 28. The cover member 30 is attached to the partition member main body 28 by being superimposed from above over the main body 32 of the partition member main body 28 so as to cover the opening of the containing recess 36. A plurality of through bores 52 are formed along the circumference of the cover member 30, whereas the partition member main body 28 and the cover member 30 are relatively positioned with each other by having positioning protrusions 54 provided to protrude from the partition member main body 28 inserted into the through bores 52.

Also, a containing space 56 is formed along the overlapping faces between the partition member main body 28 and the cover member 30 by having the opening of the containing recess 36 closed with the cover member 30, and a movable plate 58 is arranged in the containing space 56 as a movable member. The movable plate 58 is a member made of rubber elastic body in an approximate form of a circular disc, on which buffering protrusions 60 are integrally formed along the outer periphery and in the middle portion in the radial direction protruding out from both sides in the thickness direction. The movable plate 58, arranged in place in the containing space 56, is allowed to displace itself minimally therein in the thickness direction. The maximum dimension of the movable plate 58 in the thickness direction (face-to-face dimension between the buffering protrusions 60) can be made smaller than the inside dimension between the top and bottom walls of the containing space 56, but in the present embodiment, it is made approximately the same as or slightly larger than said dimension so that the buffering protrusions 60 are abutted against the inner sides of the top and bottom walls of the containing space 56 under installed condition of the movable plate 58 in the containing space 56.

Then, the top face of the partition member 26 with the structure mentioned above is overlapped with an integrally molded and vulcanized part of the main rubber elastic body 16, and the partition member 26 is attached to the integrally molded and vulcanized part of the main rubber elastic body 16 on the side of the retaining member 21. In other words, the retaining member 21 is superimposed from above over the outer periphery of the main body 32 of the partition member 26 via a rubber layer, while the annular protrusion 24 protruding downward from the retaining member 21 is inserted into the fitting groove 38 of the partition member 26. In the present embodiment, the overlapping faces between the integrally molded and vulcanized part of the main rubber elastic body 16 and the partition member 26 are adhered to each other with adhesive or the like.

Thus, by having the partition member 26 attached to the larger-diameter end of the main rubber elastic body 16, the opening of the large-diameter recess 22 is covered with the partition member 26 in a fluid tight way, and a pressure receiving chamber 62 with its walls partially composed of the main rubber elastic body 16 is formed above the partition member 26.

Also, a flexible membrane 64 is attached to the partition member 26. The flexible membrane 64 is a thin rubber membrane in an approximate form of a circular disc having enough slack. Furthermore, along the outer periphery of the flexible membrane 64, a locking protrusion 66 in an annular form is integrally formed protruding upward. The outer periphery of this flexible membrane 64 is laid over the bottom face of the partition member 26 and is positioned in the axis-perpendicular direction by having the locking protrusion 66 inserted into the locking groove 48 of the partition member main body 28.

Then, by providing a fixing member 68 in an approximate form of an annular disc overlapped and fastened to the bottom face of the partition member main body 28, the outer periphery of the flexible membrane 64 is clamped by the overlapping faces between the partition member main body 28 and the fixing member 68, thus supporting the flexible membrane 64 with the partition member 26. The means for fastening the fixing member 68 to the partition member main body 28 are not particularly limited, but in the present embodiment, the caulk-fixing is performed by having caulking protrusions 70 provided to protrude from the bottom face of the partition member main body 28 inserted through caulking holes 72 that are formed through the fixing member 68 so that the tip portion undergoes a diameter-enlarging deformation.

Thus, an equilibrium chamber 74 is formed below the partition member 26 with its walls partially composed of the flexible membrane 64 by means of having the partition member 26 attached to the flexible membrane 64 and arranged opposite the bottom face of the partition member 26 in the axial direction.

Also, an incompressible fluid is sealed in each of the pressure receiving chamber 62 and the equilibrium chamber 74 formed above and below the partition member 26, respectively. The incompressible fluid sealed in the pressure receiving chamber 62 and the equilibrium chamber 74 is not particularly limited, but, for example, water, alkylene glycol, poly-alkylene glycol, silicone oil, and mixed solution thereof are favorably used. Also, in order to effectively obtain vibration damping properties based on the flow behavior of the fluid, which will be discussed later, it is preferable to use a low-viscosity fluid under 0.1 Pa·s.

Also, a tunnel-like flow channel formed by having the opening of the peripheral groove 40 covered with the cover member 30 has its one end communicated with the pressure receiving chamber 62 via a first communication hole 76 formed through the cover member 30 and the other end communicated with the equilibrium chamber 74 via a second communication hole 78 formed through the partition member main body 28. This allows an orifice passage 80 to be formed with the use of the peripheral groove 40 communicating the pressure receiving chamber 62 and the equilibrium chamber 74 with each other. Within this orifice passage 80, the resonant frequency (tuning frequency) of the fluid flowing therein is configured in response to required characteristics by means of adjusting the ratio (A/L) of the passage section area A to the passage length L, also taking into account the spring stiffness of the walls of the pressure receiving chamber 62 and the equilibrium chamber 74. In the present embodiment, the tuning frequency of the orifice passage 80 is set as low as about 10 Hz, which is equivalent to that of the engine shake. On the inside of the outer peripheral wall of the orifice passage 80, one end of the fluid injection passage 42 opens out, which is communicated with the pressure receiving chamber 62 and the equilibrium chamber 74 via the orifice passage 80.

The containing space 56 provided in the partition member 26 is communicated with the pressure receiving chamber 62 and the equilibrium chamber 74 via a plurality of upper through holes 82 penetrating through the upper wall composed of the cover member 30 as well as a plurality of lower through holes 84 penetrating through the lower wall composed of the partition member main body 28. This allows the fluid pressure of the pressure receiving chamber 62 to exert on the top face of the movable plate 58 via the upper through holes 82 and allows the fluid pressure of the equilibrium chamber 74 to exert on the bottom face of the movable plate 58 via the lower through holes 84. Then, due to slight displacement of the movable plate 58 in the vertical direction in response to the relative pressure fluctuation of the pressure receiving chamber 62 and the equilibrium chamber 74, a fluid pressure transmission mechanism is configured that transmits the fluid pressure in the pressure receiving chamber 62 to the equilibrium chamber 74. In the present embodiment, the through holes consist of the upper through holes 82 and the lower through holes 84.

The engine mount 10 is made mountable to a power unit by having the first mounting member 12 mounted to a power unit using a bolt to be plugged into the screw hole 20, whereas the mounting portion 34 of the partition member 26 is made mountable to a vehicle body using a bolt to be inserted through the bolt hole 50 and a nut to be screwed onto said bolt. As evident from this, in the engine mount 10 of the present embodiment, the second mounting member 14 comprises the retaining member 21 and the partition member 26. In the drawings, the bolt and the like as well as the power unit and vehicle body mentioned above are omitted.

Once low-frequency high-amplitude vibration is inputted to the engine mount 10 on board the vehicle, the fluid flows between the pressure receiving chamber 62 and the equilibrium chamber 74 via the orifice passage 80 so as to exert a vibration damping effect (high attenuation effect) based on the flow behavior such as of fluid resonance action. Meanwhile, once high-frequency low-amplitude vibration is inputted to the engine mount, the orifice passage 80 is substantially blocked due to antiresonance, while a fluid pressure transmission effect caused by the slight displacement of the movable plate 58 is exerted effectively, thus obtaining a vibration damping effect (vibration isolation effect) caused by a lowered dynamic spring constant.

Meanwhile, the engine mount 10 of the present embodiment is a post-formation filling type wherein the incompressible fluid is poured into the pressure-receiving chamber 62 and the equilibrium chamber 74 via the fluid injection passage 42 only after the integrally molded and vulcanized part of the main rubber elastic body 16 and the flexible membrane 64 are attached to the partition member 26.

More specifically, the integrally molded and vulcanized part of the main rubber elastic body 16, the partition member 26, and the flexible membrane 64 are assembled in the atmosphere, and at the time of assembly, the pressure receiving chamber 62 and equilibrium chamber 74 are filled with air. Moreover, the sealing member 44 is not arranged in the fluid injection passage 42 and the other end thereof opens to the atmosphere along the outer periphery of the main body 32.

Then, by inserting a fluid injection nozzle, not shown in the drawing, into the fluid injection passage 42 to be connected to a negative pressure source, air in the pressure receiving chamber 62 and the equilibrium chamber 74 is forced out via the fluid injection nozzle to make these chambers 62 and 74 in a state of near vacuum (vacuum drawing). Upon completion of such a vacuum drawing process, the incompressible fluid is poured into the pressure receiving chamber 62 and the equilibrium chamber 74 from the fluid injection nozzle via the fluid injection passage 42 to be sealed in these chambers 62 and 74. After the sealing of the incompressible fluid, the fluid injection passage 42 is closed fluid-tight with the sealing member 44, thus preventing any leak of the sealed fluid.

Here, in the engine mount 10, a plurality of first communication grooves 86 and second communication grooves 88 are formed in the partition member 26 in order to more effectively prevent air from remaining behind during the vacuum drawing.

In other words, the first communication groove 86, as shown in FIGS. 5, 6 and 8, is a concave groove opening out on the bottom face of the partition member main body 28 opposite the flexible membrane 64, and each of its both ends in the longitudinal direction opens into one and another of the lower through holes 84, respectively, to interconnect all the lower through holes 84 arranged one next to the other. In the present embodiment, the total of seven lower through holes 84 are provided including the one arranged at the center of the main body 32 in the radial direction and six others arranged on the outer peripheral side thereof. And the total of twelve first communication grooves 86 are formed including the six connecting the central lower through hole 84 with each of the six lower through holes 84 on the outer peripheral side and six others interconnecting the lower through holes 84 on the outer peripheral side adjacent to each other in the circumferential direction.

Meanwhile, in the present embodiment, the second communication groove 88, as shown in FIGS. 6 and 8, is a concave groove opening out on the bottom face of the partition member main body 28 opposite the flexible membrane 64, one end of which in the longitudinal direction opens out into the lower through hole 84, while the other end opens out into the end of the orifice passage 80 on the side of the equilibrium chamber 74 (second communication hole 78), thus interconnecting the lower through holes 84 and the orifice passage 80. In the present embodiment, among the six lower through holes 84 arranged on the outer peripheral side, two of them arranged adjacent to the second communication hole 78 are respectively connected to the orifice passage 80 via the second communication groove 88.

In the present embodiment, the first communication groove 86 and the second communication groove 88 have approximately the same cross-sections, and the sectional width of the first and second communication grooves 86, 88 are made almost the same or smaller than the sectional depth. Also, each of the plurality of lower through holes 84 opens out on the bottom face of the central recess 46, while the first communication groove 86 is formed to open out on the bottom face of the central recess 46. Furthermore, the inner periphery of the second communication hole 78 is located along the outer periphery of the central recess 46, while the second communication groove 88 is formed to open out on the bottom face of the central recess 46. In summary, in the present embodiment, the lower through holes 84, the first communication grooves 86, and the second communication grooves 88 all open out on the same plane (bottom face of the central recess 46) extending in the axis-perpendicular direction.

In such engine mount 10 provided with the first and second communication grooves 86, 88, when air in the pressure receiving chamber 62 and the equilibrium chamber 74 is forced out via the fluid injection passage 42, retention of air therein due to the flexible membrane 64 sticking to the partition member 26 can be avoided.

In other words, once the pressure in the equilibrium chamber 74 drops down by the vacuum drawing via the orifice passage 80, the flexible membrane 64 is adsorbed to the bottom face of the central recess 46 so that the opening of the lower through holes 84 on the side of the equilibrium chamber 74 gets covered with the flexible membrane 64. In the structure of the present embodiment, the space between the plurality of lower through holes 84 as well as the space between the second communication hole 78 and the lower through holes 84 remain communicated via the first and second communication grooves 86, 88, respectively. This allows each of the lower through holes 84 to remain communicated with the fluid injection passage 42 via the first and second communication grooves 86, 88 in a stable manner, thus preventing air from remaining in the lower through holes 84.

Moreover, since air is forced out via the orifice passage 80, the flexible membrane 64 is quickly adsorbed to the side of the partition member 26 at around the opening of the orifice passage 80 (second communication hole 78). Here, in the area in the equilibrium chamber 74 away from the second communication hole 78, air is drawn toward the orifice passage 80 via the lower through holes 84 as well as the first and second communication grooves 86, 88 to be exhausted to the exterior through the fluid injection passage 42. Therefore, even if the opening of the orifice passage 80 on the side of the equilibrium chamber 74 is covered with the flexible membrane 64, retention of air in the equilibrium chamber 74 can be prevented.

Therefore, in the engine mount 10, air is effectively prevented from mixing into the pressure receiving chamber 62 and the equilibrium chamber 74 by means of a simple structure so as to avoid deterioration of vibration damping properties due to the compressibility of air or the like, thus achieving the desired vibration damping properties in a stable manner.

An embodiment of the present invention has been described in detail above, but the present invention is not limited to those specific descriptions. For example, the present invention is applicable to a fluid filled vibration damping device with the structure disclosed in Japanese Patent No. JP-B-4790668. That is, the present invention can also be applied to a structure where the pressure receiving chamber and the equilibrium chamber are respectively formed on each side of the partition member by having the second mounting member made in a cylindrical form, wherein one opening of the second mounting member is closed with a main rubber elastic body and the other opening thereof is closed with a flexible membrane, with the partition member arranged in the opposing faces between said main rubber elastic body and flexible membrane being supported by the second mounting member.

In addition, in applying the present invention to an engine mount having the basic structure described in the above-mentioned Japanese Patent No. JP-B-4790668, the fluid injection passage can be formed to open out to part of the walls of the pressure receiving chamber through the first mounting member as disclosed in said publication, or for example, it can be formed to open out to the same through the second mounting member.

Also, in the embodiment mentioned above, the second mounting member 14 comprises the retaining member 21 and the partition member 26, but the retaining member 21 is not essential and can be omitted.

Figure 10:
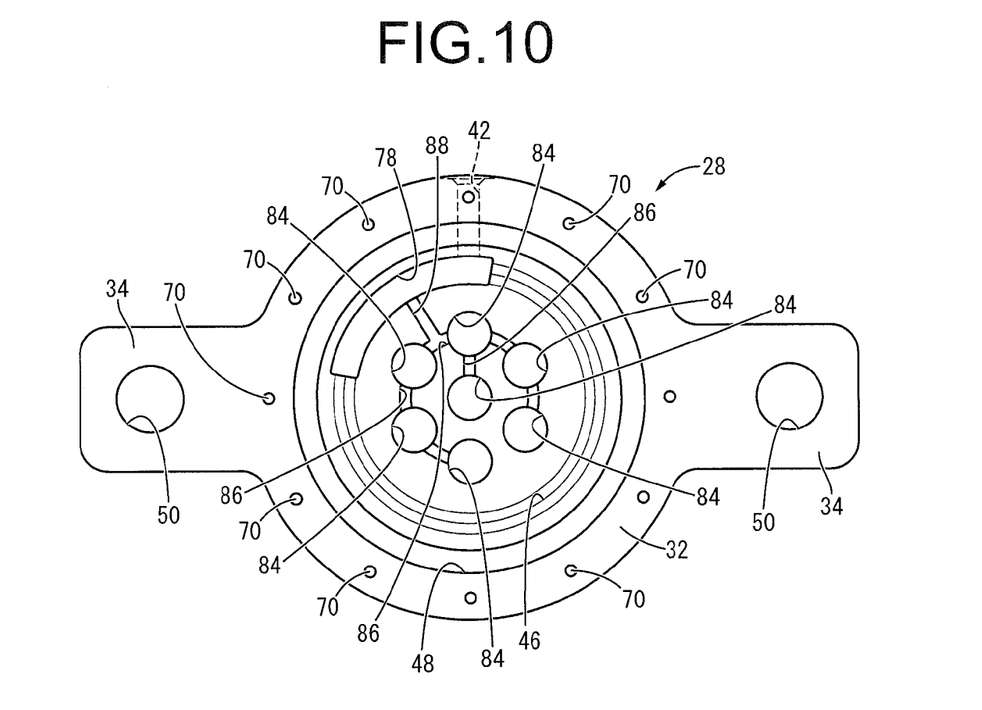
FIG. 10 is a bottom view corresponding to FIG. 8 that shows an example of another aspect of the first and second communication grooves in the embodiment shown in FIG. 1.

Furthermore, the shape and arrangement of the through holes (upper through holes 82 and lower through holes 84) are not particularly limited, but can be configured in response to required characteristics. In addition, the number of formed through holes 82, 84 is not particularly limited as long as it is no less than two. The first and second communication grooves 86, 88 formed to connect to such lower through holes 84 can be anything if they work together to connect each lower through hole 84 with the orifice passage 80. For example, as shown in FIG. 10, it is possible to reduce the number of the first communication grooves 86 to less than those in the embodiment mentioned above, or to configure the first and second communication grooves 86, 88 that were formed independently in the previous embodiment to be directly connected with each other for partially common use. In FIG. 10, for the sake of better understanding, the same numerals as those of the previous embodiment are applied to the members and parts structured in the same way as in said embodiment.

Moreover, the central recess 46 that opens up to the surface on the side of the equilibrium chamber 74 of the partition member main body 28 is dispensable, and the orifice passage 80 (second communication hole 78), through holes 82, 84, and the first and second communication grooves 86, 88 can all be provided to open out to the surface on the side of the equilibrium chamber 74 of the partition member 26.

Also, in the previous embodiment, a movable plate structure is exemplified as a movable member, but another movable membrane structure is adoptable, which is supported by the partition member 26 and made to transmit the fluid pressure in the pressure receiving chamber 62 to the equilibrium chamber 74 by means of imposing a slight deformation on the space in the thickness direction based on the relative pressure fluctuation of the pressure receiving chamber 62 and the equilibrium chamber 74.

The present invention is not only applied to the fluid filled vibration damping device to be used for an engine mount but is also applicable to the fluid filled vibration damping devices used for the body mount, sub-frame mount, and deaf mount and so forth. In addition, the applicable range of the present invention is not limited to the fluid filled vibration damping device for automobiles, but is also favorably applicable to fluid filled vibration damping devices for motorcycles, railroad cars, industrial vehicles and the like.

What is claimed is:

1. A fluid filled vibration damping device comprising:
   a first mounting member and a second mounting member, which are elastically connected by a main rubber elastic body;
   a pressure receiving chamber formed with a wall partially composed of the main rubber elastic body disposed on one side of a partition member provided on a side of the second mounting member;
   an equilibrium chamber formed with a wall partially composed of a flexible membrane disposed on an other side of the partition member;
   an orifice passage formed through the partition member to connect the pressure receiving chamber and the equilibrium chamber with each other;
   a movable member is arranged in a containing space formed in the partition member such that fluid pressures of the pressure receiving chamber and the equilibrium chamber are exerted on the movable member via a plurality of through holes that penetrate through walls of the containing space; and
   a fluid injection passage that is communicated with the pressure receiving chamber and the equilibrium chamber with an opening thereof out to an exterior closed,
   wherein the partition member is formed with a first communication groove and a second communication groove,
   wherein the first communication groove is a concave groove opening out on a bottom face of the partition member opposite the flexible membrane, and each of both ends in the longitudinal direction of the first communication groove opens into one and another of the plurality of through holes, respectively, to interconnect all the through holes arranged next to one another, and
   wherein the second communication groove is a concave groove opening out on the bottom face of the partition member opposite the flexible membrane, whereby one end in a longitudinal direction of the second communication groove opens out into one of the through holes, while an other end opens out into the orifice passage.

2. The fluid filled vibration damping device according to claim 1, wherein the first and second communication grooves are formed independent from each other.

3. The fluid filled vibration damping device according to claim 1, wherein the first and second communication grooves are formed under conditions of partially common use by being connected with each other.

4. The fluid filled vibration damping device according to claim 1, wherein one end of the fluid injection passage is open to an inner wall of the orifice passage so that the fluid injection passage is communicated with the pressure receiving chamber and the equilibrium chamber via the orifice passage.

* * * * *